(No Model.) 2 Sheets—Sheet 1.
S. D. McKELLEN.
ROLLER HOLDER FOR PHOTOGRAPHIC FILMS.
No. 433,020. Patented July 29, 1890.
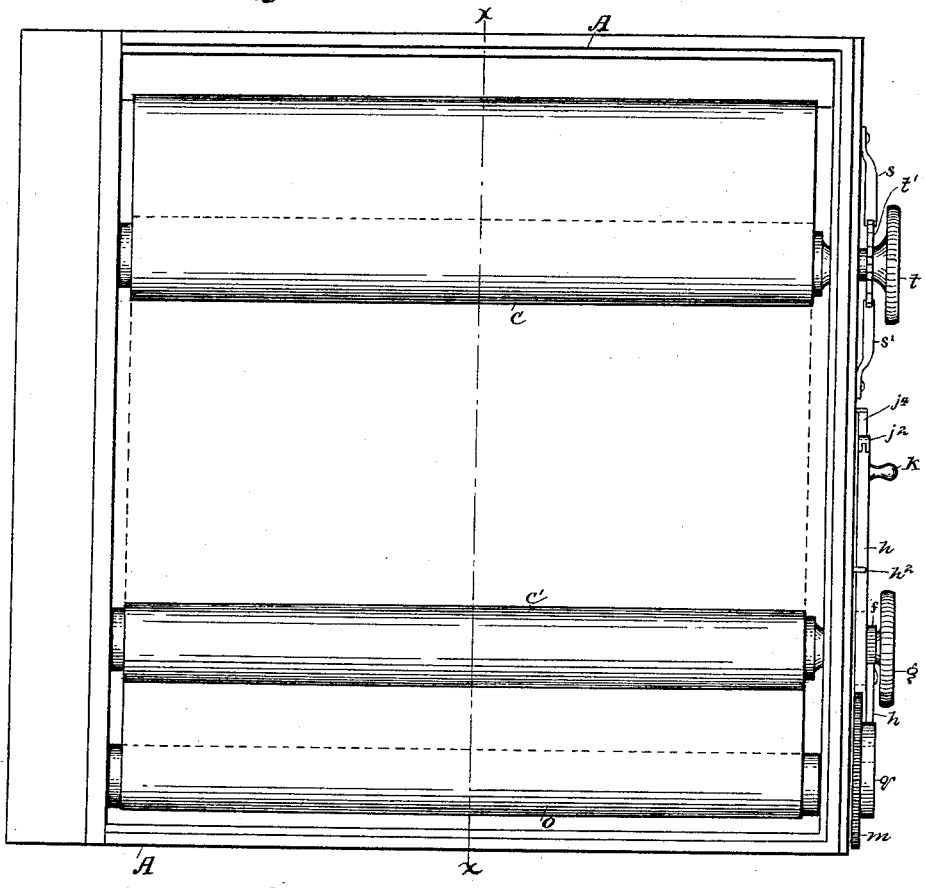
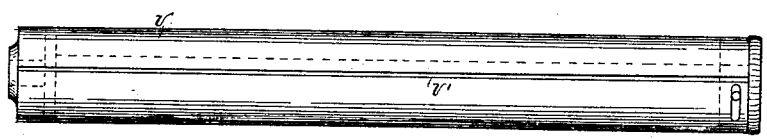
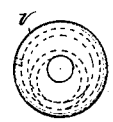
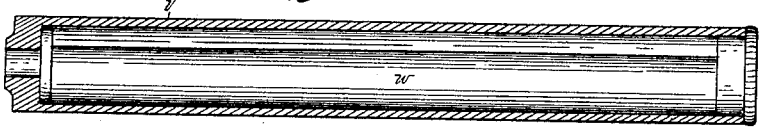
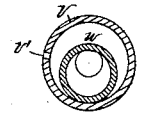
Witnesses
Fred J. Church
Alex J. Stewart
Inventor
Samuel Dunreith McKellen
by Church & Church
His Attorneys
THE NORRIS PETERS CO., PHOTO-LITHO., WASHINGTON, D. C.

(No Model.) 2 Sheets—Sheet 2.
S. D. McKELLEN.
ROLLER HOLDER FOR PHOTOGRAPHIC FILMS.
No. 433,020. Patented July 29, 1890.
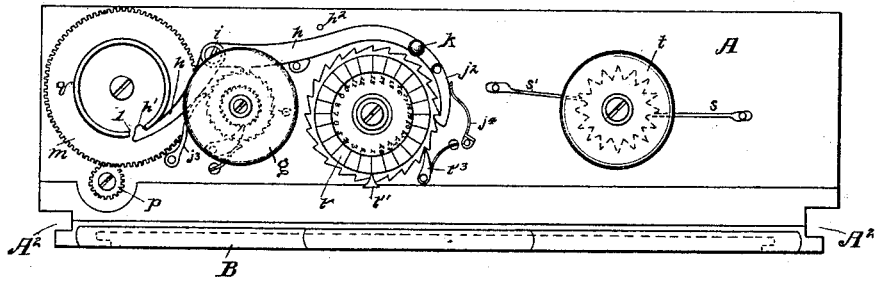
Fig. 2.
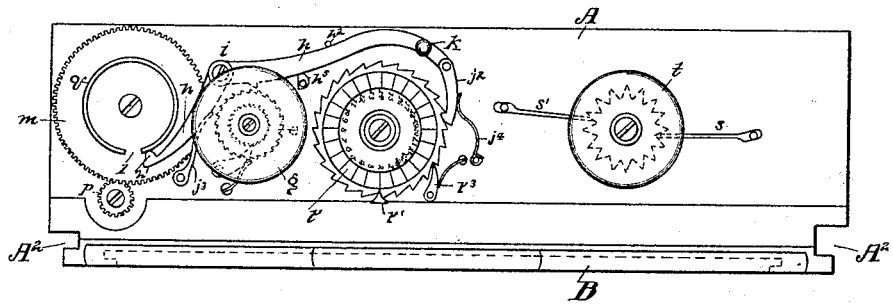
Fig. 3.
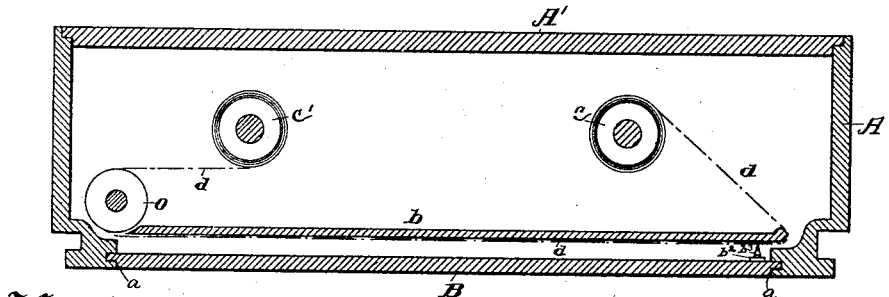
Fig. 4.
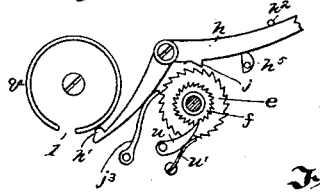
Fig. 11.
Fig. 1.
Fig. 9. Fig. 10.
Witnesses
Fred J. Church
Thomas Durant
Inventor
Samuel Dunseith McKellen
by Church & Church
his Attorneys
THE NORRIS PETERS CO., PHOTO-LITHO., WASHINGTON, D. C.

UNITED STATES PATENT OFFICE.

SAMUEL DUNSEITH McKELLEN, OF MANCHESTER, ENGLAND, ASSIGNOR TO THE EASTMAN DRY PLATE AND FILM COMPANY, OF ROCHESTER, NEW YORK.

ROLLER-HOLDER FOR PHOTOGRAPHIC FILM.

SPECIFICATION forming part of Letters Patent No. 433,020, dated July 29, 1890.

Application filed November 19, 1889. Serial No. 330,867. (No model.) Patented in England July 20, 1885, No. 8,722.

*To all whom it may concern:*

Be it known that I, SAMUEL DUNSEITH MC-KELLEN, of Manchester, England, have invented certain new and useful Improvements in Roller-Holders for Photographic Film, (for which English Letters Patent No. 8,722, dated July 20, 1885, were granted me;) and I do hereby declare the following to be a full, clear, and exact description of the same, reference being had to the accompanying drawings, forming part of this specification, and to the letters of reference marked thereon.

My invention relates to roller-holders for flexible photographic film, and has for its object to improve their construction and operation by reducing the liability of exposing a second time exposed portions of the film, or of reeling forward more film than is required for an exposure; and the invention consists in certain novel constructions and combinations of parts, as will be hereinafter fully described, and the novel features pointed out particularly in the claims at the end of this specification.

In the drawings, Figure 1 is a rear view of one form of roller-holder embodying my improvements with the back of the casing removed; Fig. 2, an end or side view of the same, showing the parts locked, preventing the winding of the film; Fig. 3, a similar view showing the parts during the winding operation; Fig. 4, a sectional view on the line $x\,x$ of Fig. 1, with the casing back in position; Figs. 5 and 6, side and end views, respectively, of a film-containing roller or spool; Figs. 7 and 8, longitudinal and cross-sectional views, respectively, of film-containing rollers or spools. Figs. 9 and 10 are sectional views of modified forms of film-containing rollers or spools. Fig. 11 is a digrammatic view of the devices employed for locking or arresting the winding devices. Fig. 12 is a detail sectional view showing the film-marker employed.

Similar letters of reference in the several figures denote similar parts.

The casing A of the holder may consist of any suitable receptacle of wood or other material provided with a back or cover A', secured in position by any suitable catches, and an opening at the front adapted to be closed, when desired, by a slide or cover B, operating in grooves $a$ in the casing. Suitable grooves or recesses $A^2$ are provided in the casing, by which it may be attached to an ordinary camera-back after the manner of a plate-holder.

In the sides of the holder-casing, preferably, are journaled two rollers or spools $c\,c'$, the former in the present construction being adapted to contain the unexposed film, and termed, for convenience, the "supply-spool," and the latter adapted to receive the film after being exposed, and termed the "winding-reel." The film, designated by $d$, passes from the spool $c$ over the face of a film support or table $b$ at the front of the holder and around a roller $o$, termed a "measuring-roller," arranged, in the present instance, at one end of the support $b$, and thence to winding-reel $c'$, as shown in Fig. 4, so that as it is wound from one spool to the other it will pass in proximity to the casing-front, and may be exposed in the camera in the usual way when the slide B is withdrawn.

In the present embodiment of my invention I have shown the slide B in position to be drawn transversely of the line of movement of the film, and in order to mark the film each time said slide is withdrawn to make an exposure I provide upon its inner side, in proximity to the film, a light spring $b^2$, carrying a point of lead $b^3$ or similar marking material adapted when the slide is moved to be drawn over the film, making a mark; but it is obvious that any suitable marking device actuated by the slide could as well be employed—as, for instance, a spur carried by the slide, adapted to make a line of punctures in the film, or a series of points on the casing may be made by the passage of the slide to press into the film when being drawn out or pushed into its place again.

The film-marker just described is adapted for use when the holder is used in a camera employing an ordinary shutter or lens-cap in which it is necessary to replace the slide after each exposure; but it will be understood that any other film-marker could be employed—for instance, one located upon or actuated by the measuring-roller or by hand.

The rollers upon which the film is wound may be of any suitable construction, and the means for clamping the film thereto may be varied greatly; but as a convenient means I preferably construct them of an external tube $v$, slotted from end to end, as at $v'$, and an internal tube or cylinder $w$, in one instance, Figs. 5, 6, 7, and 8, arranged eccentric to the outer cylinder $v$. Said end may be clamped between the two. In the other instance (see Figs. 9 and 10) the inner cylinder $w'$ is concentric with the outer and slotted, as at $w^2$, and the film is attached by passing its end through slots $v'$ and $w^2$, and then rotating the cylinders relatively to each other, as in Fig. 10, thereby securely clamping it between the two.

Upon the end of the roller or spool $c$ is provided an operating knob or handle $t$, and just below it a star or ratchet wheel $t'$, with the teeth of which co-operate two tension-springs $s$ $s'$, secured to the casing in such position that their tendency will be to force the spool backward, so as to keep the film under tension, though they are so placed that the spool may be rotated in either direction, as desired. One of these springs $s'$ is made a little longer than the other, and it will be noted that they bear upon different portions of the same or different teeth, so that there shall always be one spring pressing upon the star-wheel and maintaining the tension.

In order to obviate the objection heretofore urged against film-holders in which only visible or audible signals were employed to denote when a sufficient quantity of film has been reeled forward for a new exposure, I provide a device, preferably actuated by the film itself, adapted to lock the operating parts when film sufficient for one exposure has been wound over the film-support, preventing further movement of the film until the operator changes or resets the device.

In the present embodiment of this portion of my invention the end of the measuring-roller shaft is extended to the outside of the casing, and on its end is located a small pinion $p$, adapted to engage with a larger gear $m$, mounted on the side of the casing and to rotate the latter as the measuring-roller is operated by the passage of the film over it. Upon the face of the wheel $m$ is provided a rim or flange $q$, having an opening or notch $l$ therein, into which is adapted to be projected a projection $h'$ on one end of a locking lever or detent $h$, pivoted at $i$, and having a projection or tooth $j$, adapted to engage the teeth of a ratchet or detent wheel $e$, secured to one of the film-carrying rollers, in the present instance it being secured to the winding-reel $c'$, though it is obvious that this could be changed, if desired, and applied to the supply-spool. The locking detent or lever is normally pressed toward the rim $q$ by a spring $j^3$, and the tooth $j$ is so positioned relatively to the wheel $e$ that when the end of the detent-lever is upon the rim $q$, as in Fig. 3, the tooth $j$ will be out of engagement with said wheel; but when the end drops into the opening $l$ the spring will then engage the detent with the wheel and arrest its movement.

The measuring-roller and the gear $m$ are preferably so proportioned relatively to each other and the length of film sufficient for a single exposure as that a single revolution of the gear will be caused by the passage over the measuring-roller of a single exposure of film, thereby causing the arrest of the film-winding devices, and the object of this gearing is to provide a small measuring-roller; but it is obvious that if a measuring-roller with a circumference equal to the length of a single exposure be employed the rim $q$ or equivalent part governing the operation of the detent now carried by or operated from the gear $m$ could be mounted directly upon the end of the measuring-roller; or, if said roller, or any part operated therefrom, were large enough, several apertures $l$ or equivalent variations from the normal of the movable portion co-operating with the detent could be employed and the film be arrested a number of times during a single revolution.

A suitable projection $h^2$ is provided for limiting the outward movement of the detent-lever $h'$, and its inward movement may be also limited by a cam-block $h^5$, which, when turned to the position shown in Fig. 3, will prevent the engagement of the tooth $j$ with wheel $e$, this being desirable when the film is to be wound upon or unwound from the roller without measuring it, as when new film is inserted or old film removed.

Mounted upon or connected to roller $c'$ is a ratchet-wheel $f$, with which engages a pawl $u$, held in engagement by spring $u'$ and arranged to prevent the backward movement of said roller.

In Fig. 2 the parts are shown with the film-feeding devices locked and the detent engaging one of the rollers, this being permitted by the end $h'$ of the detent-lever entering recess $l$. In order to wind forward another exposure of film, the operator by means of knob $k$ on the detent-lever removes the projection $j$ from wheel $e$, raising the end $h'$ of the lever out of notch $l$, and then by means of knob or handle $g$ winds the film forward over the support $b$, the tension device on the supply-spool keeping it well strained. During this operation the measuring-roller is rotated by the film and causes the rotation of wheel $m$ until a full exposure is wound forward in front of the holder-opening, when the opening $l$ will be beneath the end $h'$ of the detent-lever allowing its spring to move it and cause the arrest of the film by locking its feeding devices, so that by no possibility can the operator wind forward more than the necessary quantity of film. The film may be now marked at the end of the film support by any suitable marking devices, preferably by means of a marker attached to the slide, as described, though any other could be as well employed.

It is desirable in roller-holders that the number of exposures made be counted, and that the number of exposures remaining unexposed be also indicated to the operator, and to provide for doing this and also to provide a counter or indicator that must be operated before the film can be wound forward, I locate upon the side of the holder-casing a suitable disk or wheel $r$, having teeth thereon, one corresponding to each exposure of film the holder is adapted to contain, and also provided with a series of numbers or indications, with which co-operate an index $r'$ on the casing. To the detent-lever $h$ is pivoted a pawl $j^2$, held in engagement with the teeth of the indicator-wheel $r$ by a spring $j^4$, and the arrangement is such that when the detent is operated to arrest the winding devices the pawl slides over the teeth on the indicator $r$ to the position in Fig. 2, and when the operator moves the detent out of engagement the pawl will turn the counter one notch, and so on, every time the winding mechanism is released, though it is obvious that by making slight changes the counter and indicator could be operated simultaneously with the arrest of the film. The counter-wheel is held from backward movement by a pawl $r^3$.

Of course many modifications can be made without departing from the spirit of my invention, and the arrangement and construction herein described is only one form—as, for instance, the pawl $u$, preventing backward movement of roller $c$, could be dispensed with and the roller $c$ be employed as the winding-reel, the disposition of the teeth on the wheel $e$ being changed, so as to prevent the rotation in the opposite direction, as will be understood.

The invention consisting of means or mechanism of any kind for causing the arrest of the film by the movement of a given amount in front of the exposing-opening, it is immaterial what the nature of the measuring device is, whether a wheel, roller, or reciprocating slide, and it is also immaterial whether the film is drawn forward by gripping devices or friction-rollers or by a roller to which one end is attached, as shown.

I claim as my invention—

1. The combination, with a roller-holder, of a locking device for arresting the film operated by the movement of the film itself, substantially as described.

2. In a roller-holder, the combination, with the film carrying and feeding devices, of a detent arranged to lock said parts from operation actuated by a film-measuring device, substantially as described.

3. The combination, with a film containing roller, of a detent adapted to engage the same and a film-measuring device for causing the operation of said detent, substantially as described.

4. The combination, with film carrying and feeding devices, of a detent for arresting them, a support for holding the detent out of engagement, and a film-measuring device for removing said support, substantially as described.

5. The combination, with film carrying and feeding devices, of a detent for arresting them, a spring for operating the detent, a support for holding the detent out of engagement against the spring, and a film-measuring device for moving said support, substantially as described.

6. The combination, with a film-measuring device, of a film-containing roller, a detent adapted to engage the same to prevent rotation, and a support for holding the detent out of engagement with the roller operated by the measuring device, substantially as described.

7. The combination, with a measuring device, of a film-containing roller, a detent adapted to engage the same to prevent rotation, a spring for operating the detent, a support operated by the measuring device for holding the detent out of engagement against the spring, substantially as described.

8. The combination, with a film-supply spool and a tension device applied thereto, of a winding roller or reel, a detent for arresting it, and film-measuring devices for actuating said detent at predetermined times, substantially as described.

9. The combination, with a film-containing roller, a star-wheel thereon, and two or more springs co-operating therewith arranged to engage different portions of the same or different teeth, of a roller to which one end of the film is connected, substantially as described.

10. The combination, with a film-supply spool, a star-wheel thereon, and two or more springs co-operating with said wheel arranged to engage different portions of the same or different teeth, of a winding reel or roller to which one end of the film is connected, substantially as described.

11. The combination, with film carrying and feeding devices, and a detent for locking them, of a wheel actuated by the movement of the film having a surface with which the detent co-operates and by which said detent is operated, substantially as described.

12. The combination, with film carrying and feeding devices, and a detent for locking them, of a wheel actuated by the movement of the film having a surface with which the detent co-operates, a notch therein, and a spring for holding the detent pressed against said wheel, substantially as described.

13. The combination, with film carrying and feeding devices and a locking device therefor, of a counter connected to and operated by the movement of said locking device, substantially as described.

14. The combination, with film carrying and feeding devices and a locking-detent therefor, of a counter connected to and operated by the release of said detent, substantially as described.

15. The combination, with film carrying and feeding devices and a locking device therefor actuated by the movement of the film, of a counter connected to and operated by the movement of said detent, substantially as described.

16. The combination, with film carrying and feeding devices and a locking-detent therefor actuated by movement of the film, of a pawl carried by said detent and an indicating and counting wheel actuated thereby, substantially as described.

17. The combination, with a film-containing roller and a detent for engaging it, of a measuring-roller, a wheel geared thereto having a rim or flange with which the detent engages, having an opening or notch therein, and a spring for holding the detent in engagement therewith, substantially as described.

18. The combination, with a film-containing roller and a detent for engaging it, of a film-measuring device for actuating said detent and a movable projection or cam for holding said detent out of engagement with the roller, substantially as described.

19. The combination, with a film-measuring device, of a film-containing roller, a detent adapted to engage the same and prevent rotation, a support for holding the detent out of engagement with the roller operated by the measuring device, and a cam or projection for preventing the operation of the detent when desired, substantially as described.

20. In a roller-holder for film, the combination, with the film carrying and feeding devices, of an exposing-slide movable transversely of the film and a film-marker carried thereby, substantially as described.

21. In a roller-holder for film, the combination, with the film carrying and feeding devices, of an exposing-slide movable transversely of the film and a spring secured thereto carrying a marking-point for operating upon the film, substantially as described.

22. In a roller-holder for film, the combination, with the film carrying and feeding devices, of a film-marker movable transversely across the film and actuated from the exterior of the holder, substantially as described.

23. The herein-described film-roller, consisting of an outer shell provided with a longitudinal slot and an inner roller, between which and the outer roller the film is clamped, substantially as described.

24. The herein-described film-roller, consisting of an outer shell provided with a longitudinal slot and an inner roller having a corresponding slot, said rollers being movable relatively to each other to clamp the film between them, substantially as described.

In testimony whereof I have hereunto set my hand in the presence of two subscribing witnesses.

SAMUEL DUNSEITH McKELLEN.

Witnesses:
 WM. WARBURTON,
*Solicitor, 15 Norfolk Street, Manchester.*
 ARTHUR W. CHARLESWORTH,
*Clerk to Addlerham & Warburton, Solicitors, Manchester.*